United States Patent [19]
Haustein

[11] Patent Number: 5,188,195
[45] Date of Patent: Feb. 23, 1993

[54] VEHICLE DRIVING WHEEL SUSPENSION SYSTEM

[76] Inventor: Norman E. Haustein, 2329 Longboat Dr., Naples, Fla. 33942

[21] Appl. No.: 790,539

[22] Filed: Nov. 12, 1991

[51] Int. Cl.⁵ .................. B60K 17/04; B60G 11/46; B60G 11/34
[52] U.S. Cl. .................................. 180/353; 180/371; 280/712; 280/718; 280/720
[58] Field of Search ............. 280/697, 718, 720, 712, 280/112.1; 180/337, 348, 349, 353, 356, 371; 301/133, 136

[56] References Cited

U.S. PATENT DOCUMENTS

| | | | |
|---|---|---|---|
| 562,289 | 6/1896 | De Dion et al. | 180/353 |
| 2,074,289 | 3/1937 | Wagner | 280/112.1 |
| 2,132,963 | 10/1938 | Nallinger | 280/112.1 |
| 2,692,770 | 10/1954 | Nallinger | 280/112.1 |
| 2,716,461 | 8/1955 | MacPherson | 180/292 |
| 2,753,190 | 7/1956 | Hooven | 280/112.1 |
| 2,833,553 | 5/1958 | Mindrum | 280/718 |
| 3,373,834 | 3/1968 | Rosenkrands | 180/353 |
| 3,520,548 | 7/1970 | McGee | 280/712 |
| 3,709,516 | 1/1973 | Ewert | 180/353 |
| 3,896,895 | 7/1975 | Schultz et al. | 180/370 |
| 3,952,824 | 4/1976 | Matschinsky | 180/353 |
| 4,343,375 | 8/1982 | Manning | 180/353 |
| 4,362,221 | 12/1982 | Manning | 180/353 |

Primary Examiner—Tamara L. Graysay
Attorney, Agent, or Firm—Merrill N. Johnson

[57] ABSTRACT

A driving wheel suspension system for a vehicle such as a passenger car, a van or a light or heavy truck or bus, which includes a pair of wheel support assemblies each of which consists of a leaf spring lying parallel to the vehicle's drive shaft and a wheel spindle journalled within a wheel spindle housing mounted on the center of the leaf spring, and a straight dead axle whose opposite ends are connected to one of the wheel spindle housings by a pair of spaced apart conical bearings journalled in the wheel spindle housing and surrounding the end of the straight dead axle, whereby the conical bearings supporting the dead axle prevent torsional loads being imposed on the dead axle caused by vertical displacements of the driving wheels as the vehicle is driven over rough, uneven terrain.

2 Claims, 1 Drawing Sheet

VEHICLE DRIVING WHEEL SUSPENSION SYSTEM

BACKGROUND AND BRIEF SUMMARY OF THE INVENTION

My invention relates to automotive vehicle suspension systems, and particularly to systems for the suspension of driving wheels which are maintained in parallel rotating planes by a dead axle.

For many years the driving wheels of many automotive vehicles were maintained in parallel planes by a dead axle housing which housed both the live axles connected to the driving wheels and the differential gears. The vehicle frame and body rested on springs supported on the dead axle housing inboard of the driving wheels and the wheel brakes.

While the foregoing suspension system was used for many years on many vehicles, it had a number of disadvantages. The necessity of vertical clearance between the differential housing and the underside of the body created loading problems for both passenger vehicles and heavier vehicles such as buses and trucks. Moreover, the combined weight of the dead axle housing, the differential, the live axles and a part of the drive shaft contributed to an undesirably high unsprung weight of the vehicle.

To overcome the deficiencies of the foregoing suspension system, many vehicles used a bowed dead axle as suggested in U.S. Pat. No. 562,289 to DeDion et al. DeDion type suspension systems and modifications thereof retained the advantage of a rigid connection between the driving wheels but had the additional advantage of lowering the floor of the vehicle's body because the minimum ground-to-floor distance was no longer dependent upon providing vertical clearance between the top of the differential housing and the body's floor.

However, the DeDion system has not been used on buses and heavier trucks because the bowed dead axle is subject to severe torsional stresses when resisting vertical displacement of the two driving wheels. Significant torsional displacement of the DeDion bowed dead axle produces unacceptable movements of the wheel axes and to eliminate such torsional deflection by increasing the size and weight of the bowed dead axle for buses and heavy trucks is both cost and design prohibitive.

My invention provides all the advantages of both the dead axle housing system incorporating the live axles and the differential gearing and the DeDion bowed dead axle system, while eliminating the disadvantages of these two systems. My improved suspension system reduces the vehicle's unsprung weight, substantially reduces the ground-to-floor distance of the body and provides a strong simple and inexpensive dead axle incapable of torsional displacement.

Briefly put, my unique driving wheel suspension system utilizes a straight cylindrical dead axle connecting a pair of wheel support assemblies, a body mounted differential, and universal jointed live axles connecting the driving wheels to the differential. Each wheel support assembly includes one or more leaf springs preferably with air springs mounted on its opposite ends and a wheel spindle support housing at its center. Preferably four suspension control rods are used to connect and control the position of the driving wheels, two to keep the wheel centered beneath the frame and/or body and two angled control rods to control lateral movement of the wheels. Shock absorbers are used to smooth out the ride of persons or cargo in the vehicle. In any event, my suspension system utilizes conical bearings at one or both ends of the straight dead axle which eliminate torsional loads being placed upon the dead axle by vertical displacements of the driving wheels.

By my system's elimination of the torsional loads which are imposed on all prior vehicle systems using dead axles, the weight and size of the dead axle can be markedly reduced since the dead axle need be designed to carry only the weight of the vehicle. The use of conical bearings at the ends of the dead axle eliminates the need for expensive and heavy bowed dead axles and constitutes the first major improvement in suspension systems for vehicle driving wheels since DeDion's bowed dead axle invention almost one hundred years ago.

The advantages of my vehicle suspension system for the vehicle's driving wheels include the following:

Because the dead axle can be designed to carry only the vehicle's weight, it is now possible to use a dead axle on heavy vehicles such as buses and trucks.

Reduction in the vehicle's unsprung weight.

Wider distances between left and right spring centers improves the vehicle's roll stiffness.

Passenger vehicles, vans, buses and light and heavy trucks can now all be designed with lower vehicle floors.

Increased ease of repair and replacement of parts. The dead axle, wheel spindle support housing, and leaf spring can be replaced simply by bolting in the replacement part. Moreover, the location of the dead axle to the rear of the live axles provides no interference with the repair or replacement of the power train from engine to live axles.

Because the dead axle lies to the rear of the differential housing, there are no cross members or a dead axle to interfere with the operation of the vehicles power train.

DETAILED DESCRIPTION OF THE PREFERRED EMBODIMENT

Figure 1:
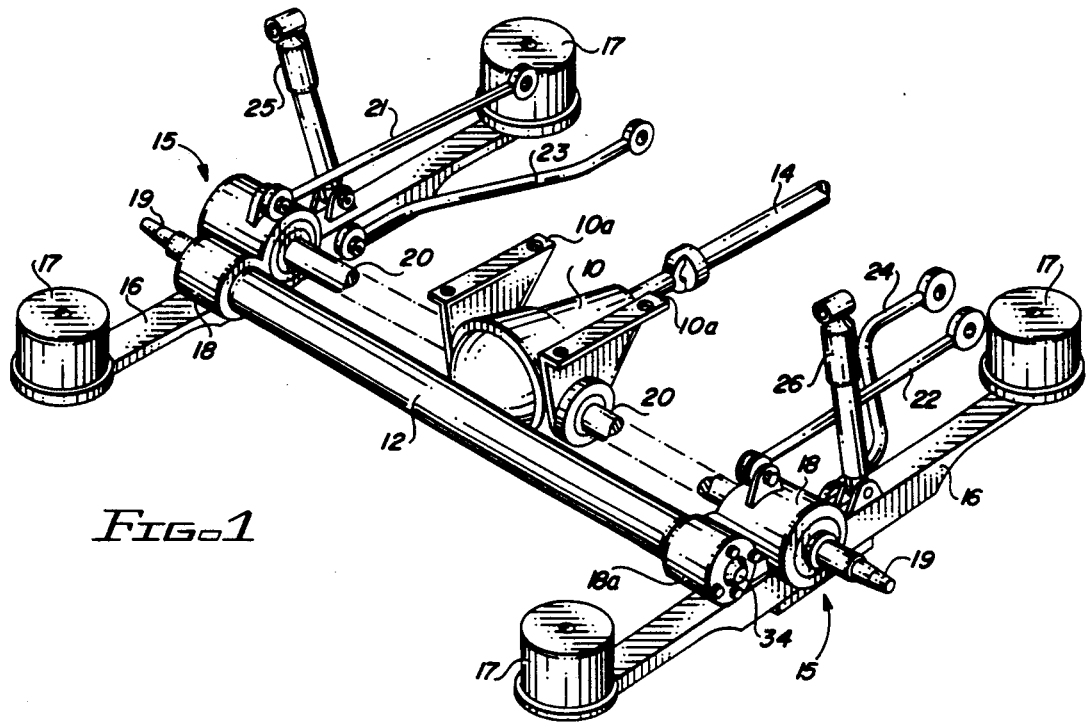
FIG. 1 is a perspective view of a vehicle driving wheel suspension system made according to my invention.
Figure 2:
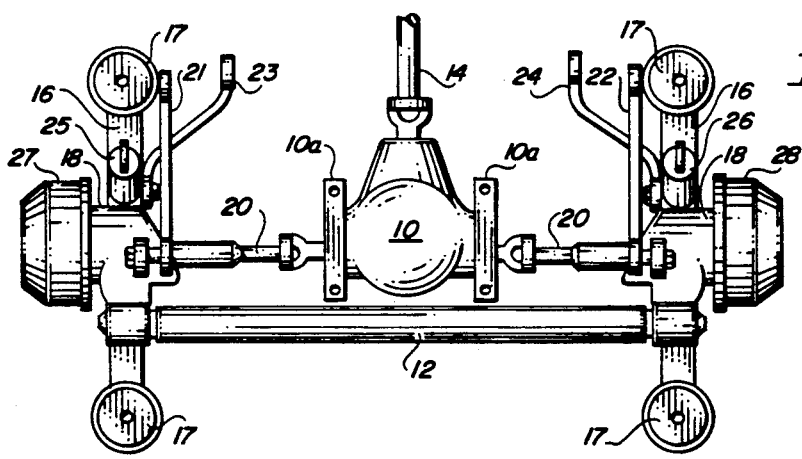
FIG. 2 is a plan view taken from above of the suspension system shown in FIG. 1.

Referring first to FIGS. 1 and 2 of the drawings, there is shown a preferred embodiment of my unique suspension system for the driving wheels of a vehicle. The suspension system shown may be suspended from the frame or body of a passenger automobile, a van, a light or heavy truck or a bus body which are not shown in FIG. 1 or 2 since the frame and body of the vehicle form no part of my invention.

Differential housing 10 shown in FIGS. 1 and 2 is bolted to the floor of the vehicle body or to the vehicle's frame by differential housing flanges 10a shown in FIG. 1. Dead axle 12 may be either a straight solid cylinder or a straight hollow cylindrical tube whose axis lies parallel to the axis of rotation of the driving wheels when the vehicle is on a flat horizontal plane. The axis of dead axle 12 lies at 90° to the axis of drive shaft 14 which supplies rotational power to the driving wheels and is connected to the differential gearing within differential housing 10.

At each end of dead axle 12 is a wheel support assembly 15 which preferably includes a leaf spring 16 lying parallel to the axis of the drive shaft 14. A pair of air springs 17 are mounted on the opposite ends of each leaf spring 16 and the upper face of each air spring is connected to the underside of the vehicle's body or frame.

Alternatively, leaf spring 16 may be a stack of leaf springs whose opposite ends are directly connected to the vehicle frame or body and air springs 17 eliminated.

Wheel support assembly 15 also includes a wheel spindle support housing 18 which is mounted on the center of leaf spring 16 and houses a wheel spindle 19 as shown in FIG. 1. A pair of live axles 20 as shown in FIG. 2 connect the differential gearing to the wheel spindles 19 housed within the pair of wheel spindle housings 18.

Four suspension control rods are used to control the position of the driving wheels in relation to the body of the vehicle. Two straight control rods 21 and 22 connecting the wheel spindle housings to the vehicle's frame or body tend to keep the driving wheels centered beneath the body, while two angled control rods 23 and 24 tend to control lateral movement of the driving wheels.

A pair of shock absorbers 25 and 26 are connected between the leaf spring 16 and the vehicle's frame or body to smooth out the ride for persons or cargo in the vehicle.

A pair of brake drums 27 and 28 mounted on wheel spindles 19 as shown in FIG. 2 are fitted with brake shoes (not shown) or other conventional means are used to apply braking pressure to the driving wheels.

Figure 3:
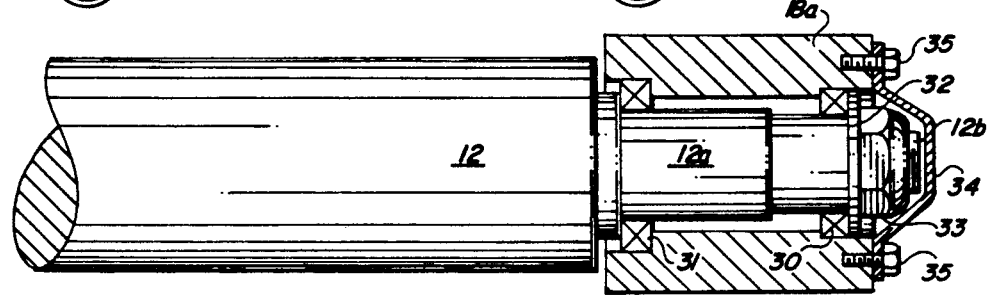
FIG. 3 is a detailed view partly in cross section showing the conical bearings surrounding the end of the dead axle and journalled in the wheel spindle housing of the suspension system shown in FIG. 1.
Figure 1:
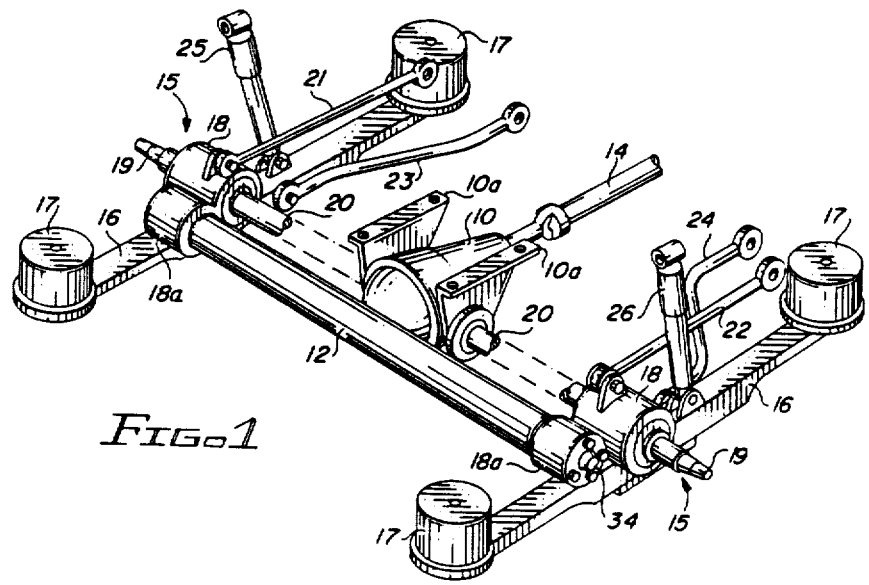
Figure 2:
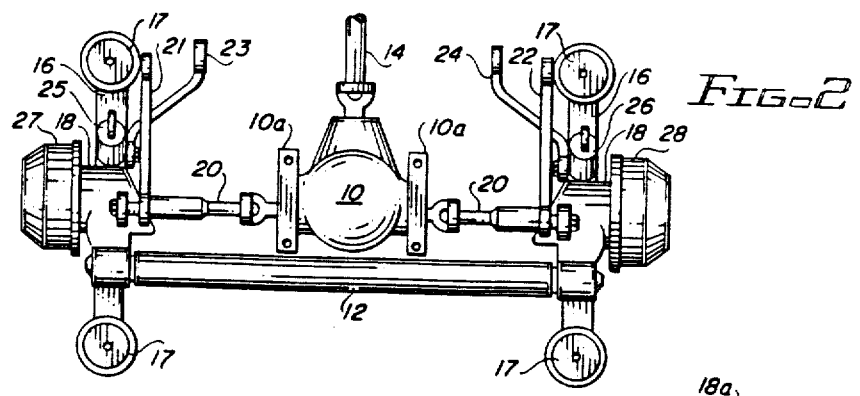
Figure 3:
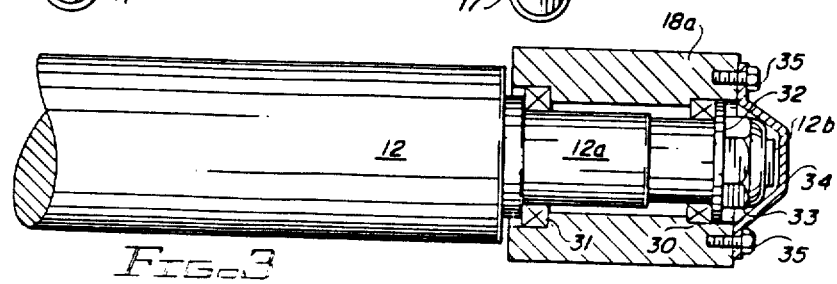

The suspension system shown in FIGS. 1 and 2 utilizes a pair of conical bearings at each end of dead axle 12 to eliminate torsional loads being placed upon the dead axle due to vertical displacement of the driving wheels as the vehicle is driven over rough, uneven terrain. FIG. 3 is a detailed view showing the end of dead axle 12 which terminates in a threaded end 12b of reduced diameter and a bearing supported portion 12a also having a diameter somewhat less than the diameter of the main straight dead axle 12.

Dead axle portion 12a is journalled within the wheel spindle housing extension 18a by front conical bearing 30 and rear conical bearing 31. The conical bearings are secured in their positions by washer 32 and nut 33 threaded onto dead axle end 12b. Cap 34 protects nut 33 and the end of dead axle 12b and cap 34 is mounted onto the wheel spindle housing extension 18a by a plurality of bolts 35 as shown in FIG. 3.

In operation, straight dead axle 12 maintains a fixed relationship between the driving wheels, keeping the wheels in parallel planes. But any torsional loads created by vertical displacement of the driving wheels caused by driving over rough terrain or potholes in the roadbed cannot be transmitted to the straight dead axle 12 because the dead axle rides upon a pair of conical bearings 30, 31 at each end of the dead axle. Any misalignment of wheel spindles 19 may cause movement of the outer races of conical bearings 30, 31 but these movements are not transmitted to dead axle 12.

While I have shown and described a preferred embodiment of my vehicle driving wheel suspension system, my invention is not limited to such embodiment and those persons skilled in the art may suggest changes and modifications falling within the scope of my invention which is limited in scope only by the appended claims.

I claim:

1. A driving wheel suspension system for a vehicle, the vehicle having a body with a floor, a pair of spaced apart driving wheels, a differential located beneath the body's floor and supported by the body midway between the driving wheels, a rotatable drive shaft one end of which is connected to the differential, and a pair of rotatable live axles each having one of its ends connected to the differential, the driving wheel suspension system comprising a pair of wheel support assemblies each including a leaf spring lying parallel to the vehicle's drive shaft, springs mounted on each end of the leaf spring and connected to the vehicle's body, and a wheel spindle within a housing mounted on the center of the leaf spring, the opposite ends of the pair of live axles each being connected to the wheel spindle within the wheel spindle housing of a wheel support assembly, and a straight dead axle whose opposite ends are connected to one of the wheel spindle housings by a pair of spaced apart conical bearings journalled in the wheel spindle housing at the end of the straight dead axle, whereby the conical bearings supporting the dead axle prevent torsional loads being imposed on the dead axle caused by vertical displacements of the pair of spaced apart driving wheels as the vehicle is driven over uneven terrain.

2. A driving wheel suspension system for a vehicle, the vehicle having a body with a floor, a pair of spaced apart driving wheels, a differential located beneath the body's floor and supported by the body midway between the driving wheels, a rotatable drive shaft one end of which is connected to the differential, and a pair of rotatable live axles each having one of its ends connected to the differential, the driving wheel suspension system comprising a pair of wheel support assemblies each including a leaf spring lying parallel to the vehicle's drive shaft whose opposite ends are connected to the vehicle's body, and a wheel spindle within a housing mounted on the center of the leaf spring, the opposite ends of the pair of live axles each being connected to the wheel spindle within the wheel spindle housing of a wheel support assembly, and a straight dead axle whose opposite ends are connected to one of the wheel spindle housings by a pair of spaced apart conical bearings journalled in the wheel spindle housing at the end of the straight dead axle, whereby the conical bearings supporting the dead axle prevent torsional loads being imposed on the dead axle caused by vertical displacements of the pair of spaced apart driving wheels as the vehicle is driven over uneven terrain.

* * * * *

UNITED STATES PATENT AND TRADEMARK OFFICE
CERTIFICATE OF CORRECTION

PATENT NO. : 5,188,195

DATED : February 23, 1993

INVENTOR(S) : Norman E. Haustein

It is certified that error appears in the above-identified patent and that said Letters Patent is hereby corrected as shown below:

Delete Drawing Sheet and substitute therefor the Drawing Sheet consisting of FIGS. 1-3, as shown on the attached page.

Signed and Sealed this

First Day of March, 1994

Attest:

BRUCE LEHMAN

Attesting Officer

Commissioner of Patents and Trademarks

Patent No. 5,188,195